United States Patent [19]
Matsuo et al.

[11] Patent Number: 5,399,406
[45] Date of Patent: Mar. 21, 1995

[54] PANELING MATERIAL AND COMPOSITE PANEL USING THE SAME

[75] Inventors: Mamoru Matsuo; Tsutomu Tagata, both of Tokyo, Japan

[73] Assignee: Sky Aluminium Co., Ltd., Tokyo, Japan

[21] Appl. No.: 191,969

[22] Filed: Feb. 4, 1994

[30] Foreign Application Priority Data

Feb. 5, 1993 [JP] Japan ................... 5-019085

[51] Int. Cl.$^6$ ........................................... B32B 9/00
[52] U.S. Cl. ................................ 428/57; 428/73; 428/166; 428/172; 428/174; 428/178; 428/192; 428/338; 52/630; 52/792; 52/795; 52/806
[58] Field of Search .................. 428/44, 68, 64, 72, 428/76, 82, 88, 116, 178, 73, 172, 174, 192; 52/630, 792, 795, 806, 785

[56] References Cited

U.S. PATENT DOCUMENTS

| | | |
|---|---|---|
| 3,011,602 | 12/1961 | Ensrud et al. . |
| 3,227,598 | 1/1966 | Robb ........................ 161/68 |
| 3,507,634 | 4/1970 | O'Driscoll . |
| 3,876,492 | 4/1975 | Schott ....................... 161/68 |
| 4,203,268 | 5/1980 | Gladden, Jr. et al. ......... 52/630 |
| 4,411,121 | 10/1983 | Blacklin et al. .............. 52/792 |
| 4,973,506 | 11/1990 | Bauer et al. ................ 428/73 |
| 5,244,745 | 9/1993 | Seksaria et al. .............. 428/593 |

FOREIGN PATENT DOCUMENTS

| | | |
|---|---|---|
| 61-255728 | 11/1986 | Japan . |
| 3-285726 | 12/1991 | Japan . |
| 3-294025 | 12/1991 | Japan . |
| 4-100641 | 4/1992 | Japan . |

*Primary Examiner*—Patrick J. Ryan
*Assistant Examiner*—Abraham Bahta
*Attorney, Agent, or Firm*—Scully, Scott, Murphy & Presser

[57] ABSTRACT

A paneling material of superior rigidity to the conventional paneling material of the similar type is presented. The paneling material includes a base section and uniformly distributed protrusions which protrude out from the base section. The paneling material is reinforced without adding much weight by providing hollow ribs which can be placed strategically depending on particular requirements of the application. The ribs can be provided on the protrusions, on the base section or on both the protrusions and the base section. The paneling material of such a design can be produced readily by superplastic forming processes. The basic paneling material may serve as a core for a composite paneling material by attaching sheet members on each side of the core paneling material. Other uses for the paneling material include decorative applications in which case the protrusions themselves may form part of the decorations.

7 Claims, 5 Drawing Sheets

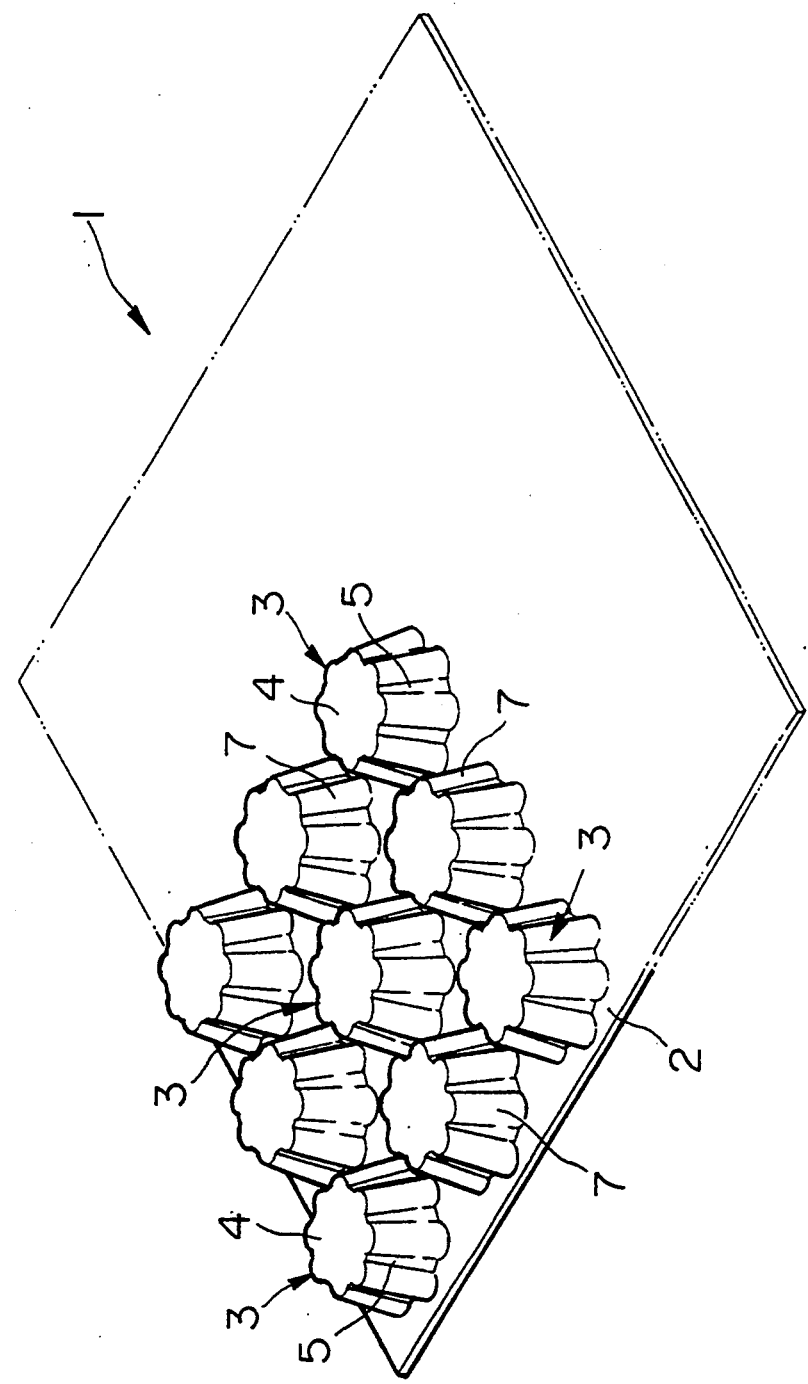

PANELING MATERIAL AND COMPOSITE PANEL USING THE SAME

BACKGROUND OF THE INVENTION

1. Field of the Invention

The present invention relates in general to paneling materials, and in particular to a paneling material of high rigidity, and a composite panel using the paneling material of the present invention.

2. Technical Background

One of the conventional structural material for architectural and automotive uses is a composite panel made of a core material having sheet members adhered to the two outer surfaces of the core material. The core material is provided with a plurality of uniformly distributed protrusions of a frustaconical shape. A protrusion is made up of a base section, a head section parallel to the base section, and a connecting ridge section which joins the head section with the base section.

The above composite panel is reinforced by the presence of the protrusions which provide rigidity and serve to determine the thickness of the panel.

With increasing demands for strong, light weight panels in architectural and automotive applications in recent years, there is a need for a paneling material of improved rigidity. The paneling material should be designed to facilitate manufacturing and to assure its long term performance.

SUMMARY OF THE INVENTION

The present invention presents a paneling material which overcomes the difficulties in the conventional types of paneling material, by providing hollow rib sections which impart rigidity to the paneling material without adding significant weight. The paneling material comprises: (a) a base section of a sheet form; (b) a plurality of protrusions of a frustum polygonal shape protruding from the base section and distributed uniformly on the base section, wherein each protrusion is provided with a connecting ridge section for joining the base section with a head section oriented roughly parallel with the base section; and (c) a plurality of rib sections joining neighboring protrusions for providing reinforcement to the paneling material and for communicating the interior spaces of the paneling material with ambient atmosphere. This basic construction of the paneling material of the present invention enables reinforcement to be provided by hollow rib sections without adding much weight to the paneling material, and the choice of locating the rib sections is made in accordance with particular requirements of the application.

An aspect of the paneling material is that the rib sections are disposed so as to provide reinforcement on the base section of the paneling material. According to this construction, only the base section of the paneling material can be reinforced by disposing the rib section.

Another aspect of the paneling material is that the rib sections are disposed so as to provide reinforcement on the protrusion section. According to this construction, only the protrusion sections of the paneling material are reinforced by the rib section.

Another aspect of the paneling material is that the rib sections are provided on both the protrusion sections and the base section. According to such a construction of the paneling material, the whole paneling material is reinforced by disposing the rib sections on both locations, and the overall performance of the paneling material is improved.

Another aspect of the paneling material is that the protrusion section protrudes out from the base section in one direction, and the rib section protrudes out from the base section in the same one direction. According to such a construction of the protrusion section and the rib section, manufacturing of the paneling material is facilitated because both protrusions are directed in the same direction.

Another aspect of the paneling material is that a composite paneling material can be produced using the paneling material of the present invention, by attaching a sheet member at least to a surface of the base section opposite to the plurality of protrusions. The rigidity of such a composite paneling material is high because of the high rigidity of the core material, which is the paneling material of the present invention.

The final aspect of the paneling material is that another type of composite paneling material can be produced by attaching a sheet member to each side of the paneling material by equalizing the height of the protrusions. This type of construction allows the vapor of the solvent to be eliminated from the composite paneling material, and assures its long term performance.

BRIEF DESCRIPTION OF THE DRAWINGS

FIG. 9 is a perspective illustration of a third embodiment of the paneling material of the present invention.

PREFERRED EMBODIMENTS

Figure 1:
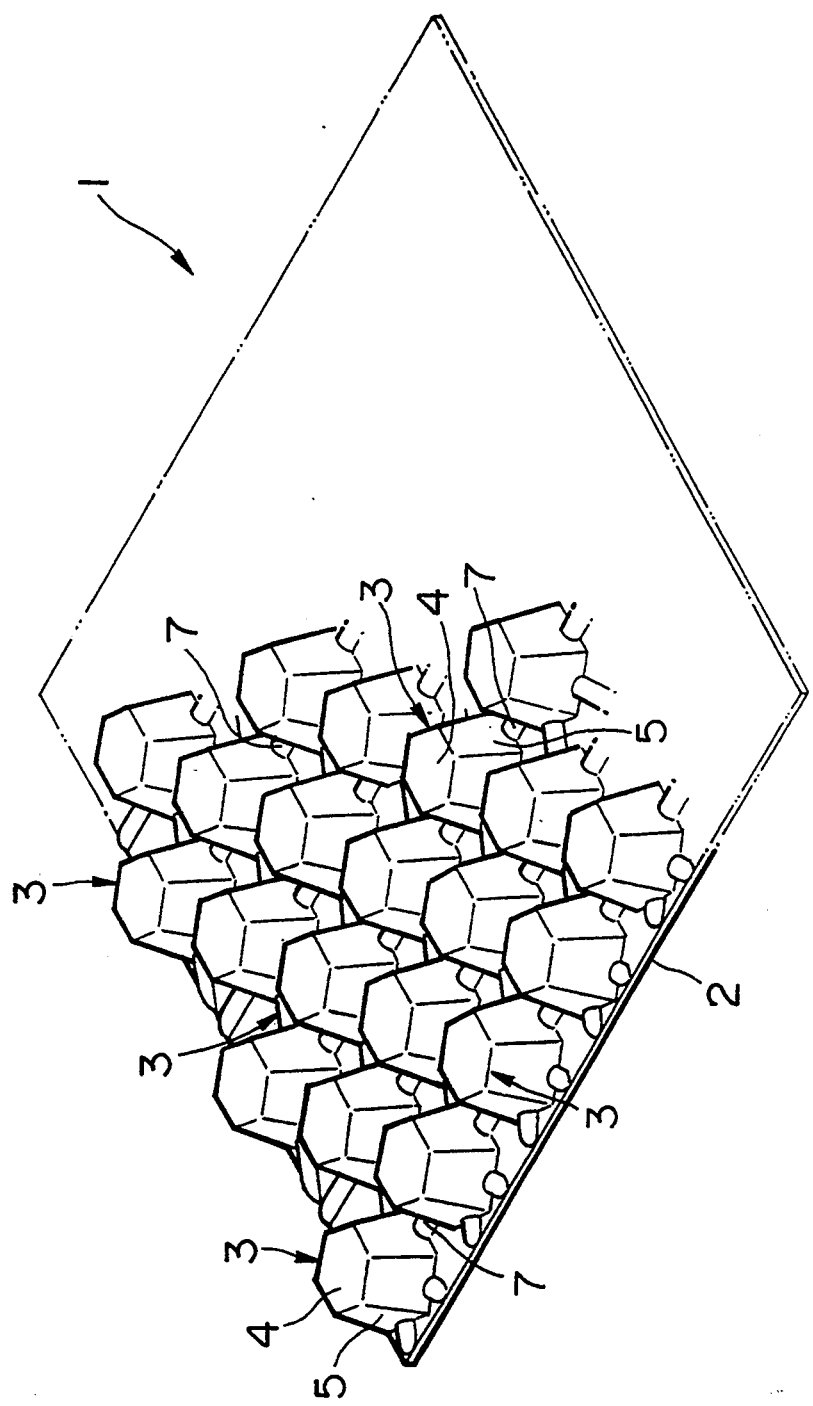
FIG. 1 is a perspective illustration of a first embodiment of the paneling material of the present invention.

Preferred embodiments will be explained with reference to the drawings provided in FIGS. 1 to 9.

In these drawings, the reference numeral 1 refers to a paneling material of this embodiment. The paneling material 1 is produced by superplastically deforming a sheet material of the so-called superplastic material made of aluminum, zinc, magnesium or copper and their alloys.

First Embodiment

Figure 2:
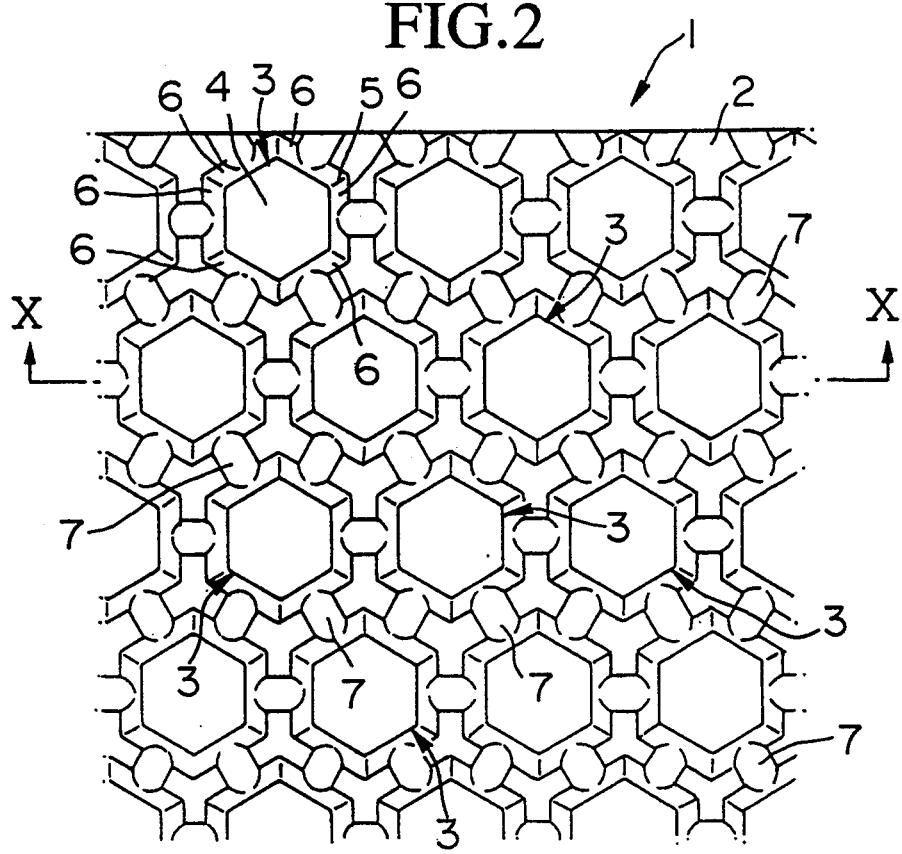
FIG. 2 is a plan view of the first embodiment of the paneling material of the present invention.
Figure 3:
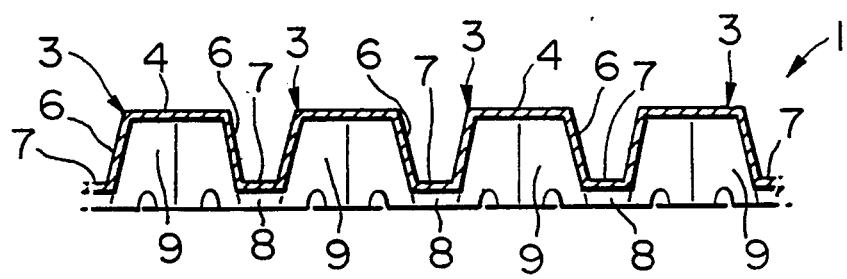
FIG. 3 is a cross sectional view of the first embodiment seen through a plane at X—X in FIG. 2.

As shown in FIGS. 1 to 3, the paneling material 1 comprises a base section 2 of a flat sheet form; and a plurality of protrusion section 3 of about equal height and shape extending in the same direction. The protrusion section 3 are shaped as a hexahedral frustum having its pointed top cut off parallel to the base section 2. In other words, the protrusion section 3 comprises a head section 4 which is roughly parallel with the base section 2, and the connecting ridge section 5 connecting the head section 4 with the base section 2. The connecting ridge section 5 comprises six plane sections 6 which are joined in a ring and, as shown in FIG. 2, the cross sectional area parallel to the base section 2 of the protrusion section 3 becomes smaller as it moves away from the base section 2.

The protrusion sections 3 are uniformly distributed on the base section 2 so that the adjacent protrusions are disposed equidistantly. In more specific detail, the adjacent protrusions 3 are disposed so that they have their plane sections 6 facing each other, resulting that a protrusion 3 is surrounded by six neighboring protrusion sections 3 to form a regular hexagon configuration.

Furthermore in this embodiment, between the opposing plane sections 6 of the adjacent protrusion sections 3, there is disposed an extending rib section 7 between the plane sections 6 to provide a reinforcement. The rib section 7 extends from the center of the base boundary region (between the plane section 6 and the base section 2) and protrudes in the same direction as the protrusion section 3. The transverse cross sectional shape of the rib section 7 (i.e. a plane at right angles to the base section 2 and to the longitudinal direction of the rib section 7) is roughly circular. The width of the rib section 7 is smaller than the width of the base boundary region connecting between the base section 2 and the plane section 6. In addition, as shown in FIG. 3, the interior hollow section 8 of the rib section 7 is communicated with the interior hollow sections 9 of the adjacent protrusion sections 3.

According to the paneling material 1 of the first embodiment, the rib sections 7 are disposed on the base section 2 so as to join together the neighboring protrusion sections 3, and therefore, the rib sections 7 serve as reinforcement and increase the rigidity of the base section 2. Therefore, the rib sections 7 provide rigidity without increasing the weight of the paneling material 1 significantly, and conversely, the paneling material 1 is made light without sacrificing its rigidity.

To distribute the strength of the paneling material 1 evenly throughout the base section 2, the transverse cross sectional shape of the rib section 7 should be made uniform in all the rib sections 7 disposed on the base section 2.

Furthermore, because all the protrusion sections 3 and all the rib sections 7 are protruding in the same direction from the base section 2, the paneling material 1 can be manufactured easily by such forming method as superplastic forming.

Figure 4:
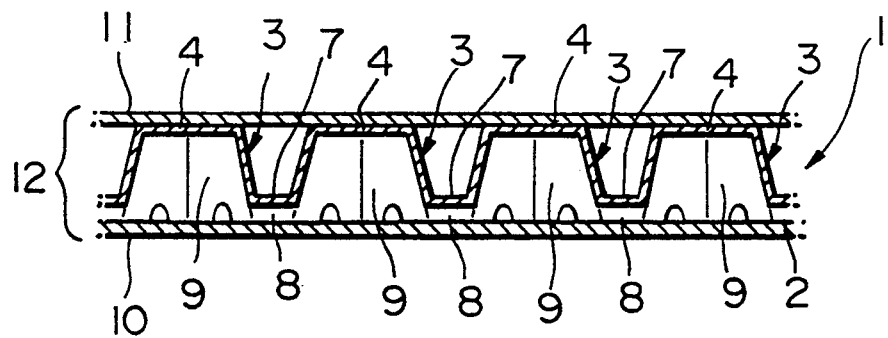
FIG. 4 is is a cross sectional view of a composite paneling material using the paneling material of the first embodiment.

Because all the protrusion sections 3 are protruding from the base section 2 in one direction, and all the rib sections 7 are protruding out in the same direction at the same height, it becomes possible to adhesively bond sheet members 10, 11, as shown in FIG. 4, to the head sections 4 of the protrusion sections 3 and to the opposite surface of the base section 2. The sheet members 10, 11 may be made of aluminum alloys, for example. The paneling material 1 with adhesively bonded outer sheet members is a composite panel 12, which is a so-called sandwiched panel, of the first embodiment.

Such a composite panel 12 exhibits at least the same rigidity properties as the core member, because paneling material 1 serving as the core has the rigidity improvement provided for the paneling material 1.

An additional processing advantage accrues from the design of the paneling material 12, because of the hollow design of the rib section 7 and the protrusion sections 3. In the composite panel 12, the hollow rib section 7 communicates the interior space 9 of the protrusion section 3 with the interior space 8 of the rib section 7.

Therefore, when the sheet member 10 is adhesively bonded to the base section 2 of the paneling material 1, there is no problem of the vapor of the adhesive solvent collecting in the interior space 9 of the protrusion section 3. When the solvent vapor remains in the spaces, it is detrimental to the properties of the surrounding materials, and the long term performance of the composite paneling material is degraded. Therefore, the provision of the hollow interconnecting spaces contributes to the long term stability in the performance of the composite panel 12, by eliminating the possibility of solvent vapor damaging the composite paneling material 12. This effect is observed also for the other sheet member 11 because the spaces between the protrusion section 3 are all communicated with each other, thus providing paths for eliminating the solvent vapor from within the composite paneling material, and assuring long term stability of the performance of the adhesively bonded composite paneling material 12.

Second Embodiment

A second embodiment of a paneling material and a composite panel using the paneling material will be explained with reference to the drawings provided in FIGS. 5 to 8. The components which are the same as in the first embodiment will be given the same reference numerals, and their explanations will be omitted.

Figure 5:
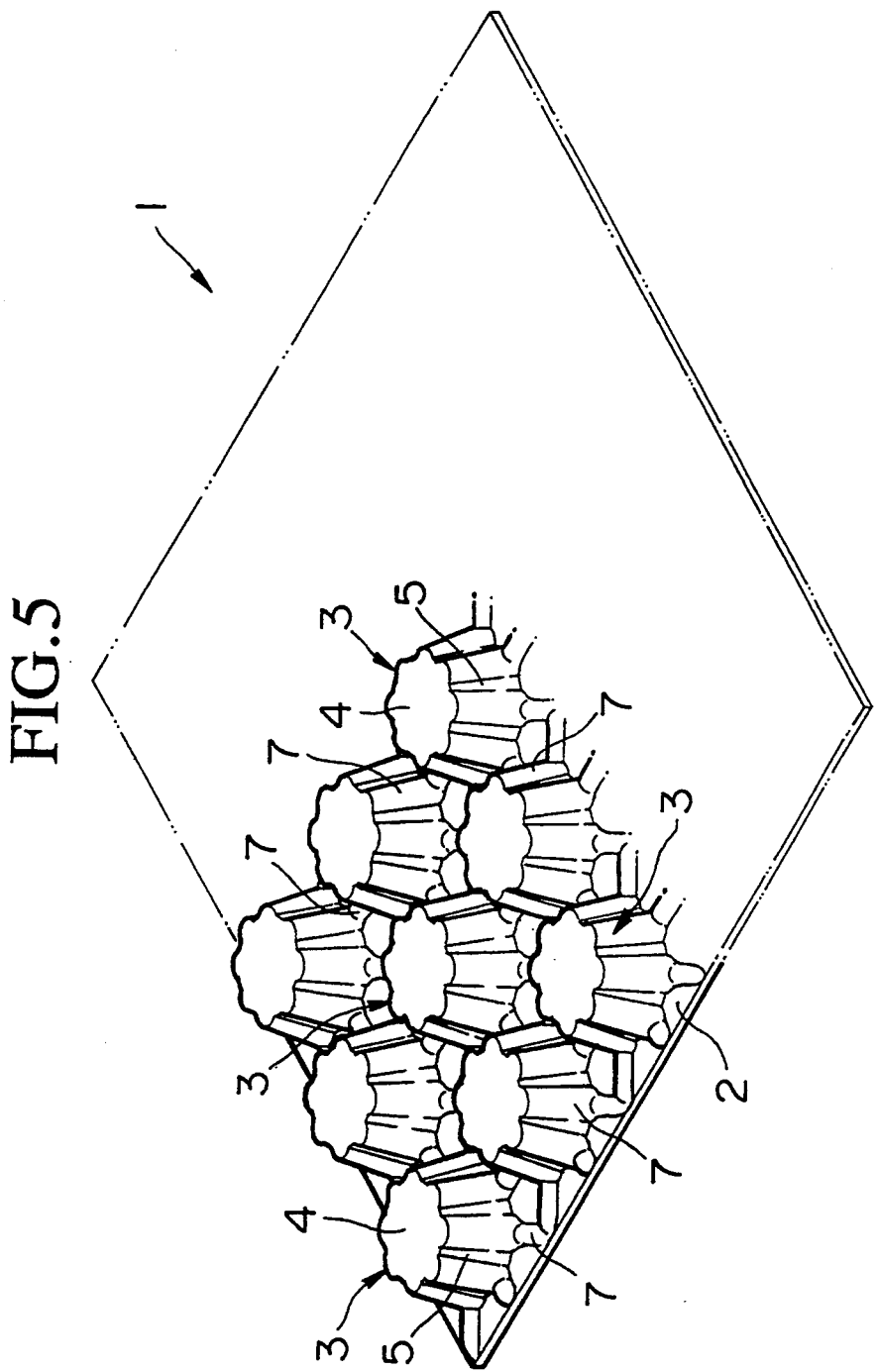
FIG. 5 is a second embodiment of the paneling material of the present invention.
Figure 6:
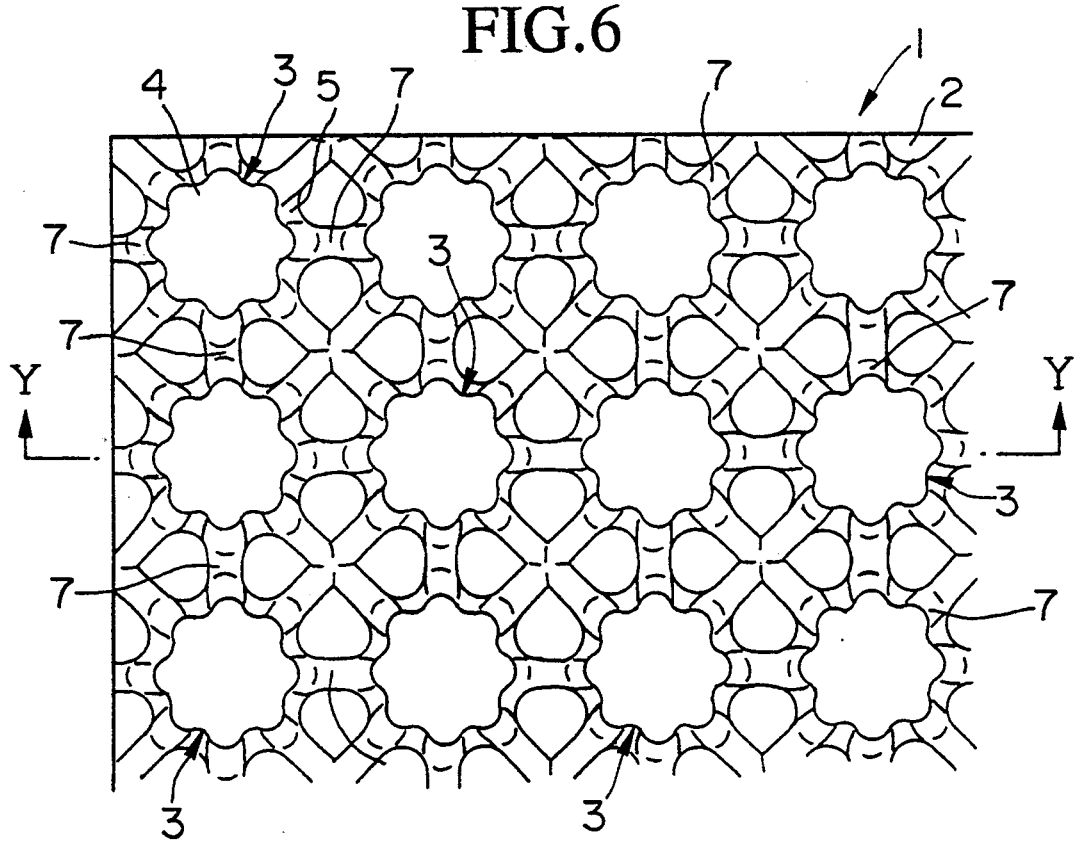
FIG. 6 is a plan view of the second embodiment of the paneling material of the present invention.
Figure 7:
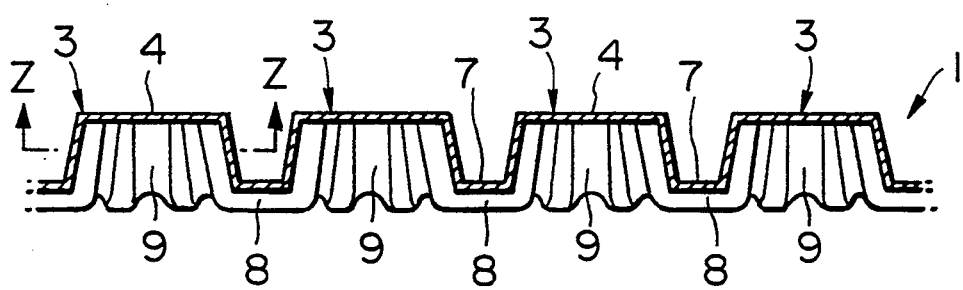
FIG. 7 is a cross sectional view of the second embodiment seen through a plane at Y—Y in FIG. 6.

The paneling material 1 also comprises a base section 2 of a flat sheet form; and a plurality of protrusion section 3 of about equal height and shape extending in the same direction, as shown in FIGS. 5 to 7, which are shaped as a hexahedral frustum having its pointed top cut off parallel to the base section 2. In other words, in the second embodiment, the transverse dimension of the connecting ridge section 5 (of the protrusion section 3 connecting the head section 4 with the base section 2), becomes smaller as it moves away from the base section 2.

Furthermore, the protrusion section 3 of the second embodiment is disposed uniformly at the intersection points of the imaginary lattices on the base section 2. In other words, as shown in FIG. 6, the protrusion sections 3 are disposed on the base section 2 in a regular geometric pattern so that the neighboring protrusions are about equidistant from each other, in the vertical and horizontal direction.

Figure 8:
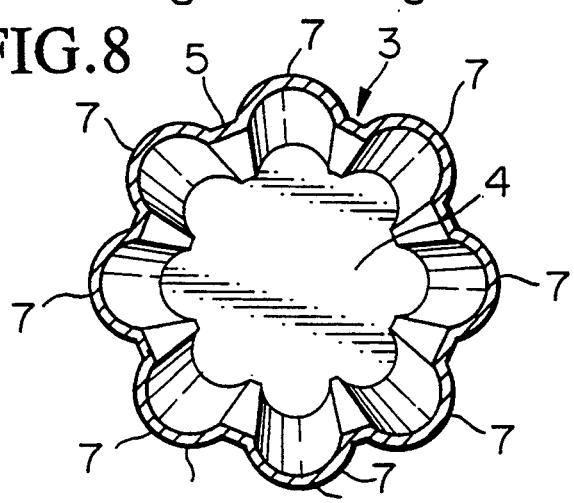
FIG. 8 is a sectional view of the second embodiment seen through a plane at Z—Z in FIG. 7.

In this embodiment also, the rib sections 7 are made so that they protrude in the same direction as the protruding section 3 and that they are formed in a plurality of directions, vertical, horizontal and at angles, so as to connect with all the neighboring protrusion sections 3. Further, the rib sections 7 of the second embodiment extend continuously from the base section 2 to the head boundary region (between the head section 4 and the connecting ridge section 5). The rib section 7 on the connecting ridge section 5 protrudes out in an arc towards the outer radial direction of the protrusion section 3, as shown in FIG. 8. The terminal end of the rib sections 7 is closed by the head section 4, thus forming eight uniformly spaced rib sections 7 of an arc shape around the outer periphery of the head section 4.

The construction of the paneling material 1 of the second embodiment ensures that the protrusions 3 themselves are also made rigid, in addition to stiffening the base section 2, by extending the rib sections 7 up to the head boundary region (between the connecting ridge section 5 and the head section 4). It is obvious that rib section 7 produces the same improvement in strengthening the base section 2, and that the same type of hollow rib construction assures the long term performance of the bonded sections, as in the first embodiment, by assuring that the solvent vapor will be removed from the paneling material 1.

It is clear that the rigidity is also increased for a composite paneling material utilizing the paneling material 1 of the second embodiment.

A third embodiment is shown in FIG. 9. The panel member 1 of the third embodiment is similar to that of the second embodiment excepting that the rib sections 7 on the base section 2 are removed. This paneling material 1 is constructed so that the rib sections 7 are disposed only on the connecting ridge section 5 of the protrusion section 3, so that they extend from the base boundary region 5 to the head boundary region. The third embodiment shows that the basic idea of reinforcing can be applied only to the location that is most appropriate for a particular need. The rib sections 7 in the third embodiment are used to provide rigidity especially to the protrusion section 3.

Therefore, it follows that a composite paneling material which utilizes the paneling material 1 of the third embodiment in a sandwich configuration with the outer sheet members will also be effective in providing rigidity to the composite paneling material.

It should be noted that although the first to third embodiments presented a construction such that the protrusion sections 3 are all protruding out in the same direction, it will be clear that the protrusion sections can be made to protrude out alternately in both direction of the base section. The application of the rib section to provide rigidity to the paneling material would also be effective in this type of construction. A composite paneling material utilizing the paneling material of such a configuration will be made by bonding an outer sheet member to the head sections on each side of the base section. In such a composite panel, the rib sections can protrude out in either directions perpendicular to the base section. In this type of construction, too, the hollow rib sections would not interfere with proper bonding of the outer sheet members, and the sheet members would not close off the interior spaces of the protrusions.

The shapes of the protrusions 3 in the paneling material 1 of the first to the third embodiments are made as either a conical or hexahedral shape of a frustum type. It is clear that the paneling material of the present invention is not restricted to these types of configurations. Other possible shapes include polyhedrons of frustum type and the like.

The paneling material 1 of the first to the third embodiments was used as the core member of a composite paneling material. However, the panel member 1 itself can be used directly, for example, as decorative panels for interior design purposes. For such decorative applications, it is not necessary that the height of the protrusions be uniform, nor is it necessary that the shape of the rib sections be the same. Other possible applications of the paneling material include construction panels, acoustic equipment and sound proofing equipment.

It has been demonstrated with examples above that the paneling material having hollow rib sections joining the protrusions of the present invention provides superior rigidity combined with features of light weight compared with the conventional paneling materials of similar designs.

What is claimed is:

1. A paneling material comprising:
   (a) a base section of a sheet form;
   (b) a plurality of protrusions of a frustum polygonal shape protruding from said base section and distributed uniformly on the base section, wherein each protrusion is provided with a connecting ridge section for joining the base section with a head section oriented roughly parallel with the base section; and
   (c) a plurality of hollow rib sections joining neighboring protrusions for providing reinforcement to said paneling material and for communicating the interior spaces of said paneling material with ambient atmosphere.

2. A paneling material as claimed in claim 1, wherein said rib section is provided on the base section.

3. A paneling material as claimed in claim 1, wherein said rib section is provided on the connecting ridge sections of said protrusion from the base boundary region, and extending along the connecting ridge section up to the head boundary region.

4. A paneling material as claimed in claim 1, wherein said rib section is provided on the base section as well as on the connecting ridge section.

5. A paneling material as claimed in claim 1, wherein said protrusion section protrudes out from the base section in one direction, and said rib section protrudes out from the base section in the same one direction.

6. A composite paneling material using the paneling material claimed in claim 1, wherein a sheet member is attached to at least a surface of said base section opposite to said plurality of protrusions.

7. A composite paneling material using the paneling material claimed in claim 1, wherein a sheet member is attached to a surface of said base section opposite to said plurality of protrusions, and a sheet member is attached to said head section of said plurality of protrusions formed at a uniform height.

* * * * *